UNITED STATES PATENT OFFICE.

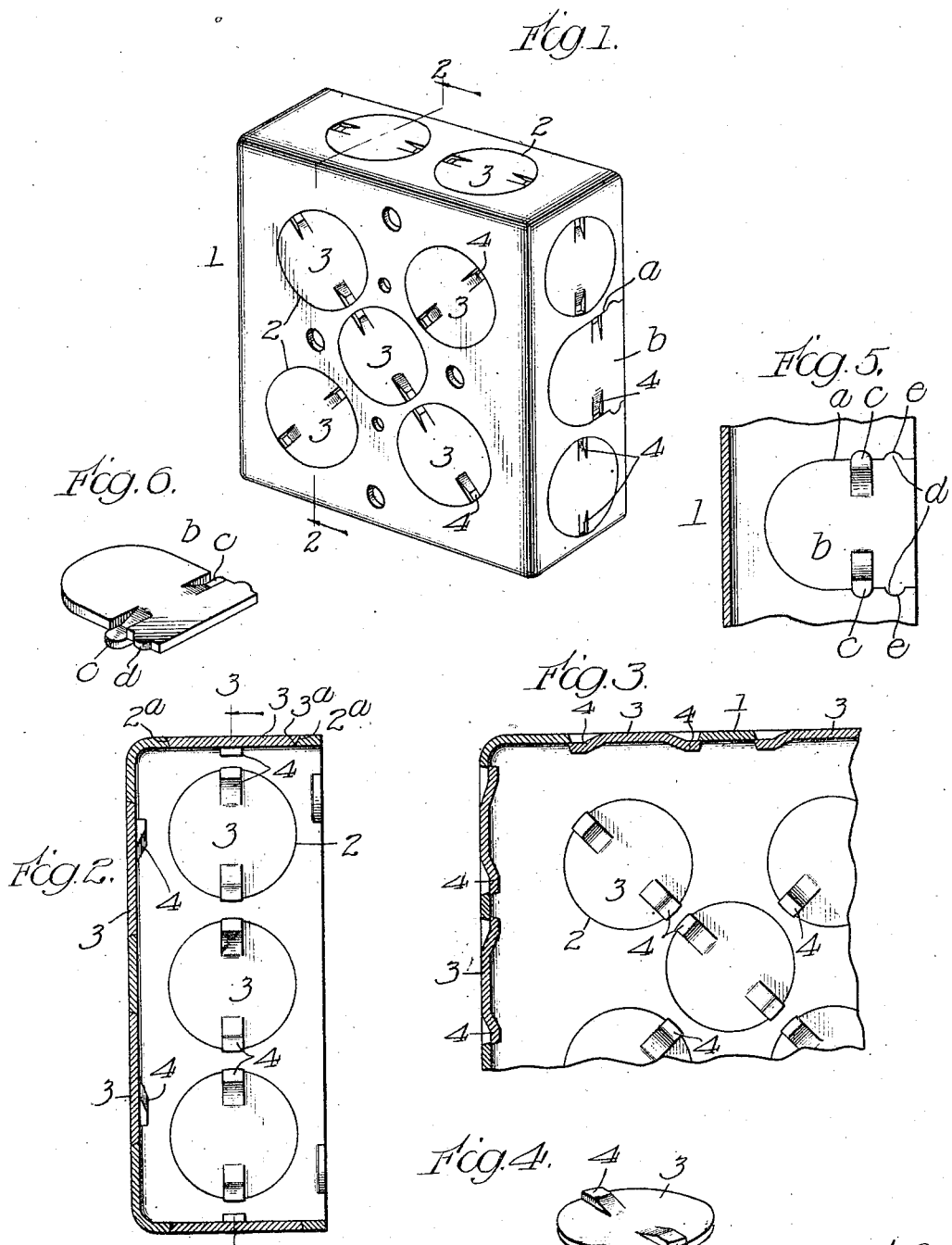

ALBERT I. APPLETON, OF CHICAGO, ILLINOIS, ASSIGNOR TO CHICAGO FUSE MANUFACTURING COMPANY, OF CHICAGO, ILLINOIS, A CORPORATION OF ILLINOIS.

ELECTRIC OUTLET-BOX.

1,052,642.   Specification of Letters Patent.   Patented Feb. 11, 1913.

Application filed June 11, 1909. Serial No. 501,464.

*To all whom it may concern:*

Be it known that I, ALBERT I. APPLETON, a citizen of the United States, residing at Chicago, in the county of Cook and State of Illinois, have invented certain new and useful Improvements in Electric Outlet-Boxes, of which the following is a specification.

This invention relates to electric outlet boxes having one or more conduit-receiving openings that are closed by plugs, which plugs are adapted to be knocked out of the openings when conduits are to be brought into the box.

The object of the invention is to improve the means for securing the plugs in place in their openings.

In the accompanying drawings, Figure 1 is a perspective view of an outlet box embodying the features of my invention. Fig. 2 is a section on line 2 2 of Fig. 1. Fig. 3 is a fragmental sectional view on line 3 3 of Fig. 2. Fig. 4 is a detail perspective view of one of the plugs. Fig. 5 is a fragmental sectional view showing a plugged opening in the edge of the box. Fig. 6 is a perspective view of the plug shown in Fig. 5.

The box 1 may be of any size and shape desired and may have any number of openings 2 in its walls, the walls $2^a$ of said openings being tapered, as shown in Fig. 2, to make the openings of larger diameter at the outer side of the box wall than at the inner side thereof. It will be seen that the wall $2^a$ is smooth or unbroken, as distinguished from a shouldered wall. The plugs 3 which are used for closing the openings 2 also have tapering edges $3^a$ to correspond with the walls of said openings. When the plugs 3 are in place in their openings, these tapered walls prevent accidental removal of the plug from the box in one direction, in this instance, inwardly.

The means for preventing separation of the plug and the box in the opposite direction comprises two diametrically opposite lips 4 formed integral with the plug 3, said lips being bent out of the plane of the plug and being of sufficient length to overlie the edges of the opening upon the inner face of the box wall.

As shown at $a$ in Fig. 5, the openings adjacent the outer edge of the box may extend to said edge for convenience in inserting conduits. The plugs $b$ for closing the openings $a$ correspond in shape to said openings. Like the plugs 3, the plugs $b$ are held against accidental withdrawal in an outwardly direction by lips $c$ and from accidental withdrawal in an inwardly direction by the tapering form of the walls of the openings $a$ and the edges of the plugs $b$. Lugs $d$ on the plugs $b$ fitting in recesses $e$ in the wall of the box prevent withdrawal of said plugs in the plane of the box wall.

The plugs 3 and $b$ are not frictionally held in their openings, but are positively secured therein by the lips 4 and $c$ and by reason of their tapering form.

In use, when it is desired to enter a conduit into the box, one of the plugs 3 or $b$ is knocked out to provide an opening for the conduit.

I claim as my invention:

1. An outlet box having an opening in one edge of a wall thereof and a plug lying in said opening, the edges of said plug and said opening being tapered to prevent accidental separation of the plug and the box in an inward direction, and two lips on opposite sides of said plug, said lips being bent out of the plane of the plug and the box wall and overlying the box wall at the edges of the opening to prevent accidental separation of the plug and the box in an outward direction, said plug having a projection thereon adapted to lie in a recess in the box wall to prevent accidental withdrawal of the plug in the plane of the wall.

2. An outlet box having an opening in one edge of a wall thereof and a plug lying in said opening, the edges of said plug and said opening being complementarily shaped to prevent accidental separation of the plug and the box in one direction, and lips on the edges of said plug overlying the edges of the wall around said opening to prevent accidental separation of the box and the plug in the opposite direction, said plug having a projection thereon lying in a recess in the box wall to prevent withdrawal of the plug in the plane of the wall.

ALBERT I. APPLETON.

Witnesses:
C. PAUL PARKER,
GEORGE L. CHINDAHL.